Patented Apr. 15, 1952

2,592,560

UNITED STATES PATENT OFFICE 2,592,560

POLYEPOXIDE COMPOSITIONS

Sylvan Owen Greenlee, Louisville, Ky., assignor to Devoe & Raynolds Company, Inc., Louisville, Ky., a corporation of New York No Drawing. Application November 2, 1945, Serial No. 626,449

13 Claims. (Cl. 260—47)

This invention relates to new polyepoxy products and compositions resulting from the reaction of polyhydric phenols and polyepoxides in regulated proportions which are valuable compositions for use in the manufacture of varnishes, molding compositions, adhesives, films, fibres, molded articles, etc. The invention includes the new polyepoxy products and compositions and methods for their production, and articles and products made therefrom.

One of the objects of the invention is the production of new polyepoxy polyhydroxy products by the reaction of polyhydric phenols with more than the equivalent proportion of polyepoxides so that each phenolic hydroxyl reacts with an epoxy group of a polyepoxide to form polyepoxy polyhydroxy compound free from phenolic hydroxyl groups.

Another object of the invention is the production of diepoxy dihydroxy derivatives of dihydric phenols using proportions of about 2 mols of diepoxide to 1 mol of dihydric phenol to form ether derivatives with the terminal groups each containing an epoxy and a hydroxyl group.

Another object of the invention is the production of complex polymeric polyepoxides by the reaction of polyhydric phenols and polyepoxides in proportions such that polymeric chains are formed containing a plurality of polyhydric phenol residues united through polyhydroxy-containing nuclei from polyepoxides and with terminal epoxy-hydroxy-containing groups.

Another object of the invention is the production of compositions containing polyhydric phenols and polyepoxides in proportions suitable for reaction by direct addition and without the formation of by-products to form resins, films, molding compositions, etc.

Another object of the invention is the production of intermediate reaction products of polyhydric phenols and polyepoxides which are capable of further reaction to form insoluble, infusible products, and the preparation of higher molecular weight and more complex epoxy compositions from such lower molecular weight epoxy compositions.

Another object of the invention is the production of complex polymeric reaction products of polyhydric phenols and polyepoxides having terminal epoxide groups and intermediate hydroxyl groups and capable of reaction to form final insoluble, infusible products.

Another object of the invention is the production of compositions containing polyepoxides together with complex polyhydric phenols which are themselves complex polyether reaction products of polyhydric phenols with terminal phenolic hydroxyl groups.

Another object of the invention is the production of films, articles, molded products, and other final reaction products of outstanding properties from such polyepoxy combinations.

Other objects of the invention will appear from the following more detailed description.

The polyhydric phenols used in making the new products and compositions include phenols containing two or more phenolic hydroxyl groups which may be in one nucleus as in resorcinol or in different nuclei of fused ring systems as in 1,5-dihydroxy naphthalene, or in different nuclei of ring systems attached by chains composed of one or more atoms, in which case the chains should be free from elements which interfere with the reaction of the polyepoxides with the phenolic hydroxyl groups. The phenolic nuclei or the chains linking phenolic nuclei may contain substitutes providing they do not interfere with the desired reaction of the polyepoxide with the phenolic hydroxyl groups. Illustrative of polyhydric phenols which may be used in making the new complex polymerization products are mono-nuclear phenols such as resorcinol, hydroquinone, catechol, phloroglucinol, etc. and polynuclear phenols such as bis phenol (p,p'-dihydroxy diphenyl dimethyl methane), p,p'-dihydroxy benzophenone, p,p'-dihydroxy diphenyl, p,p'-dihydroxy dibenzyl, bis-(4-hydroxy phenyl) sulfone, 2,2'-dihydroxy 1,1'-dinaphthyl methane, polyhydroxy naphthalenes and anthracenes, o'-p'-tetrahydroxy diphenyl dimethyl methane and other dihydroxy or polyhydroxy diphenyl or dinaphthyl dialkyl methanes, etc.

The polyhydric phenols may themselves be complex reaction products, e. g. of 2 mols of a dihydric phenol with 1 mol of a diepoxide, or of 3 mols of a dihydric phenol with 2 mols of a diepoxide, etc., and containing free phenolic hydroxyls on each terminal dihydric phenol nucleus. More complex and higher polymeric products resulting from the reaction of, e. g., dihydric phenol with less than the equivalent amount of diepoxide to give reaction products containing terminal phenolic hydroxyl groups, can similarly be used.

The polyhydric phenols may also be complex reaction products of simpler polyhydric phenols, such as bis phenol, with dichlorides such as dichlordiethyl ether, dichlorbutene, etc. in the presence of caustic soda and in proportions so that the resulting reaction products will contain terminal phenolic hydroxyl groups. Thus a complex polyhydric phenol may be produced from bis phenol with dichlordiethyl ether and caustic alkali which may be assumed to have the following formula:

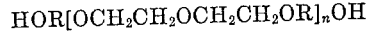
HOR[OCH₂CH₂OCH₂CH₂OR]ₙOH in which R is the residue from bis phenol and $n$ indicates the degree of polymerization which may be, e. g., 1, 2, etc. Complex polyhydric phenols from, e. g., bis phenol and dichlorbutene with the use of caustic alkali may be assumed to have the following general formula:

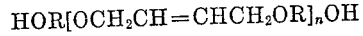
HOR[OCH₂CH=CHCH₂OR]ₙOH in which R and $n$ have the meaning indicated above. The complex polyhydric phenols thus produced from dichlorides and simpler polyhydric phenols are more complex or polymeric products in which, e. g., two simpler dihydric phenol residues are united through a residue from the dichloride. With less than two molecular proportions of the simpler dihydric phenol to one of the dichloride, and with the simpler dihydric phenol used in excess of the dichloride, a polymeric product is produced in which, e. g., 3 mols of dihydric phenol are reacted with 2 mols of dichloride; or to give products of a higher degree of polymerization.

In special cases complex polyhydric phenols may be used which are produced by the reaction of dibasic acids with polyhydric phenols such as bis phenol to give products which, in the case of the use of adipic acid with bis phenol, may be considered to have the following formula:

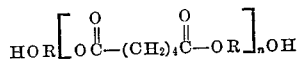

in which R is the residue from the bis phenol and $n$ the degree of polymerization. Similar products can be made from other dibasic acids.

The polyepoxides used for reaction with the polyhydric phenols contain two or more epoxide groups. The simplest diepoxides will contain at least four carbon atoms, as in the case of 1,2-epoxy-3,4-epoxy butane. The epoxy groups may be separated from each other by ether groups or linkages as in the case of bis-(2,3-epoxy propyl) ether, bis-(2,3-epoxy 2-methyl propyl) ether, etc. The polyepoxides may also be of a somewhat more complex character such as those which result from the reaction of 2 or more mols of a diepoxide with 1 mol of a dihydric phenol, or the reaction of 3 or more mols of a diepoxide with 1 mol of a trihydric phenol, etc. Diepoxides or polyepoxides derived from polyhydric alcohols such as mannitol, sorbitol, erythritol or polyallyl alcohol may also be used. The polyepoxy compounds used may have varying structures and may be of complex structure so long as they do not contain groups which interfere with the reaction between the epoxide groups and the phenolic hydroxyl groups. The polyepoxides are free from reactive groups other than epoxide and aliphatic hydroxyl groups.

The simpler diepoxides can be produced and obtained of a high degree of purity by fractional distillation to separate them from byproducts formed during their manufacture. Thus bis-(2,3-epoxy propyl) ether or diglycid ether can be produced and separated by fractional distillation to give products of high purity, e. g., around 97% or higher as determined by the method of epoxide analysis hereinafter referred to. When polyepoxides are produced of higher molecular weight and which are difficult to isolate by fractional distillation they can nevertheless be advantageously used, after purification to remove objectionable inorganic impurities and catalysts such as caustic alkali and without separation of the diepoxides or polyepoxides from admixed byproducts such as monoepoxide products, etc. Valuable polyepoxides for use in making the new compositions can be obtained by the reaction of epichlorhydrin on polyhydric alcohols containing 3 or more hydroxyl groups. Thus a trihydric alcohol such as glycerol or trimethylol propane can be reacted with epichlorhydrin in the proportions of 1 mol of trihydric alcohol to 3 mols of epichlorhydrin, using a catalyst which will promote the reaction of the epoxide group of the epichlorhydrin with a hydroxyl group of the alcohol, and with subsequent treatment of the reaction product to remove chlorine from the reaction product and to produce a polyepoxide. Such polyepoxides may contain, e. g., approximately 2 epoxy groups per molecule, even though 3 mols of epichlorhydrin are reacted with 1 mol of a trihydric alcohol. More complex or side reactions apparently take place which result in the production of products containing free hydroxyl groups or cyclic ring compounds or polymeric compounds which may be present in the resulting product. But such polyepoxide products can nevertheless advantageously be used as polyepoxides for reaction with polyhydric phenols in forming the new compositions.

The polyepoxides used may contain small and varying amounts of admixed monoepoxides. To the extent that monoepoxides are present they will react with the polyhydric phenols to form terminal groups or residues containing hydroxyl groups and to the extent that such terminal hydroxyl groups are present the complex polyepoxide compositions will contain complex epoxy-hydroxyl compounds containing both terminal epoxide-containing residues and terminal hydroxyl-containing residues. The presence of monoepoxides or of monoepoxy-hydroxyl compounds does not interfere with the production of the new products provided a sufficient amount of polyepoxides is present to serve as polyfunctional reactants with the polyhydric phenols. The presence of monoepoxy hydroxyl compounds may be desirable and advantageous. During the final hardening operation and at higher temperatures the epoxy groups may react with hydroxyl groups to form more complex reaction products.

In the case of the reaction of a dihydric phenol with a diepoxide the simplest diepoxide composition made from 2 mols of diepoxide to 1 of dihydric phenol may be considered to have the following general structure or formula:

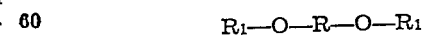
R₁—O—R—O—R₁ where R is the residue of the dihydric phenol and R₁ is an epoxy-hydroxy-containing residue of the diepoxide used. Thus in the case of the diepoxide from butylene dioxide and a dihydric phenol in the proportion of 2 mols of butylene diepoxide to 1 of dihydric phenol the resulting diepoxide may be considered to have the following formula or structure:

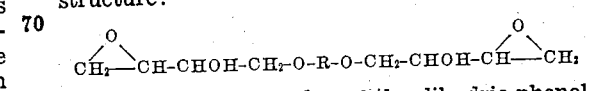

in which R is the residue of the dihydric phenol. It will be seen from the above formula that each terminal group or residue united to the dihydric phenol by an ether linkage contains both an epoxy group and a hydroxyl group.

In the case of more complex polymeric products, and assuming the formation of a straight chain polymer, the polymeric products may be considered to have the following formula or structure:

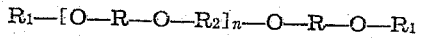

in which $R_1$ and $R$ have the meaning above indicated and $R_2$ is a residue of the diepoxide containing e. g., 2 hydroxyl groups and $n$ indicates the degree of polymerization e. g., $n=1$ or more.

The above formula assumed a straight chain polymeric reaction in which the epoxide groups of the diepoxide react only with phenolic hydroxyls. The diepoxides may, however, react through one of their epoxide groups with an intermediate alcoholic hydroxyl to form branch chain polymers or polyepoxides.

In general, the proportions of polyepoxide and polyhydric phenol should be such that the polyepoxide used is in excess of that which is equivalent to the polyhydric phenol so that all of the phenolic hydroxyls will be reacted with the polyepoxide and so that the terminal groups will be epoxide-containing groups. Thus, in general, the proportion of polyepoxide may be twice or more than twice that equivalent to the polyhydric phenol. In general, in the case of dihydric phenols and diepoxides, the proportion of diepoxide to dihydric phenol should be more than 1 mol of diepoxide to 1 mol of dihydric phenol and may be greater than 2 mols or more of diepoxide to 1 mol of dihydric phenol, e. g., 3 mols of diepoxide to 2 mols of dihydric phenol, or 4 mols of diepoxide to 3 mols of dihydric phenol, or 5 mols of diepoxide to 4 mols of dihydric phenol, etc.

Assuming complete reaction between all of the phenolic hydroxyl groups with epoxide groups, and assuming a straight chain reaction and polymerization, the number of intermediate diepoxy residues will be one less than the number of phenolic residues, and the number of terminal epoxide residues containing epoxide groups will be sufficient to satisfy the remaining phenolic hydroxyls, i. e., 2 in the case of a dihydric phenol. To the extent that diepoxides react with alcoholic hydroxyl groups additional terminal epoxy-containing groups may also be present.

Thus, in the case of a diepoxide made from 3 mols of a simple diepoxide such as butylene diepoxide or bis-(2,3-epoxy propyl) ether and 2 mols of bis phenol, and assuming the formation of a straight chain polymer, the resulting compound would correspond to the above formula in which $n=1$, in which R represents the two bis phenol residues, $R_2$ the intermediate dihydroxyl-containing residue from the diepoxide, and $R_1$ the two end components or residues each containing an epoxide and a hydroxyl group.

With higher polymeric products, corresponding to a composition in which $n$ is more than 1, and particularly in the still higher polymeric products, the reaction may take place in stages to produce intermediate reaction products of intermediate molecular weight and which may still contain some unreacted phenolic hydroxyl groups capable of further reaction with epoxide groups in a subsequent stage of reaction.

The reaction products produced according to the present invention are polyepoxy-polyhydroxy products. Even with 2 mols of diepoxide reacting with 1 mol of dihydric phenol the product will contain two hydroxyl groups as well as two epoxy groups. With complex polymeric products the number of hydroxyl groups will increase and one alcoholic hydroxyl group will be formed whenever an epoxide group reacts with a phenolic hydroxyl. The reaction of an epoxide group with an alcoholic hydroxyl group will not decrease or increase the number of hydroxyl groups. In products of higher degree of polymerization an increased number of hydroxyl groups will be present. Thus, a product made from 6 mols of a diepoxide such as butylene diepoxide or bis-(2,3-epoxy propyl) ether and 5 mols of bis phenol, and assuming the formation of a linear polymer such as illustrated in the above formula, the compound produced will contain two epoxy groups and ten hydroxyl groups.

The reaction of the polyhydric phenols and polyepoxy compounds can readily be accomplished by heating the reactants together for a short time. In general, reaction temperatures of around 50–250° C. can be used. The temperature and time for any given reaction depend on the proportions and reactivity of the reactants and whether the reaction is to be carried to completion or to an intermediate stage. In some cases it is advantageous to add traces of basic catalyst such as caustic alkali to the mixtures of polyepoxide and polyhydric phenol, although in many if not most cases heat alone is sufficient to produce the required reaction and particularly in the case of intermediate reaction products of a resinous character.

The degree of polymerization can in part be regulated by regulating the proportions of excess polyepoxide used. Thus, when all of the phenolic hydroxyls have reacted with epoxide groups and the excess epoxide equivalent is present as terminal epoxide groups, the reaction is complete so far as terminal phenolic hydroxyls and polyepoxide is concerned. The tendency of the reaction appears to be one primarily between phenolic hydroxyls and epoxide groups, although reaction between epoxide groups and alcoholic hydroxyl groups may take place to some extent, particularly in the later stages of reaction. During the final reaction of converting the intermediate reaction product into a final infusible product the reaction appears to be one primarily between terminal epoxide groups and alcoholic hydroxyl groups, although, to the extent that phenolic hydroxyls may have remained unreacted in the intermediate product, further reaction between phenolic hydroxyls and epoxide groups can take place in the final hardening.

The present invention provides a wide range of compositions and reaction products, including initial mixtures of polyhydric phenols and polyepoxides, partial or intermediate reaction products of such initial mixtures, and compositions containing such intermediate reaction products as well as final reaction products.

Thus the polyhydric phenol and polyepoxide in the desired reacting proportions may be admixed and used as a coating or impregnating composition or in making molding compositions or in solution to make film-forming compositions and the reaction which results in forming the final reaction product may be carried out after the initial composition has been so used. Thus bis phenol and bis-(2,3-epoxypropyl) ether, e. g., in the proportions of 2 mols of bis phenol to 3 of bis-(2,3-epoxypropyl) ether or 3 mols of bis phenol to 4 mols of bis-(2,3-epoxypropyl) ether when admixed form a thinly fluid liquid composition which together with, e. g., a trace of a catalyst such as caustic soda, or without the addition of such a catalyst, can be used for impregnating porous or fibrous materials or in making molding compositions and the reaction between the bis phenol and diepoxide carried out after such impregnation or in the form of a molding composition or as a film, etc. to convert the composition into the final reaction product. The use of such a composition has the advantage that the reaction takes place by direct addition between epoxide and hydroxyl groups and without the formation of byproducts which require removal.

Instead of making compositions of the initial polyhydric phenols and aliphatic polyepoxides, compositions can advantageously be made of intermediate reaction products. Thus an initial reaction product can be made from a polyhydric phenol and a simple polyepoxide, using the polyhydric phenol in excess, to form an intermediate reaction product containing terminal phenolic hydroxyl groups, and which is itself a polyether derivative resulting from the reaction of polyhydric phenol and polyepoxide. Thus, for example, an intermediate reaction product can be made, e. g., from 2 mols of bis phenol and 1 mol of a diepoxide such as butylene diepoxide or bis-(2,3-epoxypropyl) ether, or from 3 mols of bis phenol and 2 of such diepoxides, or 4 mols of bis phenol and 3 mols of such diepoxides, etc. The resulting intermediate reaction products will be polyether derivatives of polyhydric phenols with terminal phenolic hydroxyl groups. Such intermediate reaction products can be admixed with further amounts of such diepoxides sufficient to react with the free terminal phenolic hydroxyl groups and advantageously in excess of that amount to give a composition which on further heating will further react between epoxide groups and phenolic hydroxyl groups and also between epoxide groups and intermediate alcoholic hydroxyl groups to form final reaction products. Such compositions can similarly be used in forming molding mixtures or in solution to form coating compositions and the final hardening carried out in the mold or in the form of a film, etc.

The polyepoxides used with the polyhydric phenols may similarly be reaction products of polyhydric phenols with an excess of simple or aliphatic polyepoxide to form intermediate polyether derivatives of the polyhydric phenols having terminal epoxide groups. For example, 1 mol of bis phenol may be thus reacted with 2 mols of butylene diepoxide or of bis-(2,3-epoxypropyl) ether, or 2 mols of bis phenol can be reacted with 3 mols of such diepoxides, etc. to give intermediate reaction products which are polyether derivatives of bis phenol having terminal epoxide groups. And such intermediate reaction products can be admixed with intermediate reaction products having terminal phenolic hydroxyl groups, such as those above referred to, to form compositions capable of reaction on further heating to form the final reaction products. In such compositions the amount of terminal epoxide groups should in general be sufficient to react with the terminal phenolic hydroxyl groups and should advantageously be in excess of that amount so that reaction can also take place between epoxide groups and intermediate alcoholic hydroxyl groups.

In such intermediate reaction products it is not necessary that the reaction should be carried to completion in forming such intermediate reaction products since the further reaction in the final heating and hardening of the composition will take place through direct addition of epoxy and hydroxyl groups.

Intermediate compositions can also be prepared by using the polyhydric phenols and polyepoxides in proportions capable of reacting to form a final infusible product by carrying out the reaction to an intermediate stage such that it is still soluble or fusible and by then using the intermediate reaction product, e. g., in solution to form films or coating compositions or in making molding compositions, etc. and effecting the final reaction by further heating while the composition is in the form of a film or of a molding composition, etc.

In general the intermediate reaction products, unless too highly polymerized, are soluble in solvents such as acetone, methyl ethyl ketone, diacetone alcohol, cyclohenanone, etc. The resinous reaction products of lower melting point and lower degree of polymerization may be soluble in toluene but the higher melting resins of a higher degree of polymerization are insoluble in this solvent. Solutions of the intermediate resins or of reaction compositions, such as those above referred to, can be used in making clear and pigmented varnishes, in making transparent films and filaments, and in impregnating and laminating and coating wood, fabrics and other porous or fibrous materials, etc. When a small amount of a suitable catalyst is added to the solution, and in some cases even without the addition of such a catalyst, the resulting film or coating on heating is converted into an infusible product.

The intermediate reaction products, where the phenolic hydroxyls are completely or substantially completely reacted with the epoxides, will contain hydroxyl and epoxy groups as their reactive groups. These intermediate reaction products are useful for esterification with organic acids to form esters which are useful as plasticizers or as drying oil compositions, etc. depending upon the type of organic acid used. In general, the esters with low molecular weight acids such as acetic and benzoic acids give brittle resins which are soluble in typical varnish constituents including drying oils and are excellent resins for varnish manufacture. Esters of the new complex reaction products with unsaturated acids such as those derived from unsaturated oils form excellent drying compositions. The new reaction products can thus be used as polymeric polyhydric alcohols for producing drying oil compositions such as those described in my prior application Serial No. 502,317, filed September 14, 1943, now Patent No. 2,456,408. When the complex epoxides of the present invention are so used both the epoxide groups and the hydroxyl groups can be esterified, the epoxide group being for this purpose equivalent to two hydroxyl groups. Thus the new complex epoxide compositions, considered as polyhydric alcohols for esterification with fatty acids for making drying oil compositions, have terminal epoxy groups in the end components of the molecules as well as intermediate hydroxyl groups and both the epoxide and hydroxyl groups are reactive for esterification. Even the simplest composition such as that referred to above and made from 2 mols of a simple diepoxide such as butylene diepoxide or bis-(2,3-epoxypropyl) ether and one mol of dihydric phenol has an equivalent of six hydroxyl groups capable of esterification (two terminal epoxide groups and two intermediate hydroxyl groups). Products of a more complex polymeric nature may be made containing e. g., up to 15 or more hydroxyl groups, including each epoxy group as equivalent to two hydroxyl groups.

Esters made from the new complex epoxide reaction products with long chain saturated acids such as lauric, palmitic, and stearic acids give wax-like products useful as waxes and plasticizers. Many variations and types of useful products may be obtained by esterifying the new complex epoxy compositions with various combinations of saturated and unsaturated, monobasic and polybasic, and resin acids or the anhydrides of such acids.

While for purposes of esterification the epoxy groups of the new compositions are the equivalent of hydroxyl groups, for other purposes than esterification the epoxy groups are not the equivalent of hydroxyl groups, but are reactive groups capable of reacting with hydroxyl groups, and also capable of reaction with other reactants, particularly poly-functional and cross-linking reactants which enable insoluble, infusible products to be obtained. When an epoxide group reacts with an alcoholic hydroxyl group an ether linkage is formed and a hydroxyl group is also formed. The reaction products contain intermediate hydroxyl groups as well as terminal epoxide groups. Because of the property of epoxide groups of combining with hydroxyl groups the intermediate reaction products are capable of reacting under suitable conditions of temperature to form more complex reaction products or mixtures. Such compositions, particularly when a small amount of suitable catalyst is added such as an alkali phenoxide will further react by combining different molecules through ether linkages formed from epoxide and hydroxyl groups. Products of an intermediate degree of polymerization can thus be further reacted to form insoluble and infusible products in which most or all of the epoxide groups have been reacted with hydroxyl groups to form ether linkages.

The new products and compositions of the present invention are valuable products for making varnishes, protective coatings and films, as molding resins, or as molding compositions, as adhesives, as films or filaments, etc. Resinous products can readily be made of varying melting points, epoxide content and degree of polymerization from soft resins to harder resins of higher melting point. In general, these resins are soluble, unless too highly polymerized, in solvents such as acetone, methyl ethyl ketone, diacetone alcohol, cyclohexanone, etc. And solutions of the resins can be used in making clear or pigmented varnishes, in making transparent films, and in impregnating wood, fabrics and other fibrous materials, for bonding wood in making laminated structures or plywood, for surface coating of wood, fabric, etc., and for making pigmented as well as clear films or coatings on glass, wood and metal, etc. When a small amount of a catalyst is added the resulting film or coating, etc. on heating, e. g. to 150° C. or 200° C. for a short time, is converted into an insoluble, infusible product. The new compositions make excellent bonding materials for glass when polymerized in layers between glass plates.

Similarly, the new products and compositions can be used in making molding compositions and articles by admixing a small amount of catalyst and heating to effect final hardening or polymerization. The products are characterized by remarkable chemical resistance.

It is one of the characteristics of the new products that on final polymerization, or reaction between epoxide and hydroxyl groups, the products tend to expand on hardening, as distinguished from resins that shrink on heat hardening.

This lack of contraction or slight expansion in the mold on hardening is highly valuable for many applications, enabling tight fitting molded articles to be obtained. For example, brushes of many types are made by using a heat converting resin to cement the bristles into the brush ferrule. If the resin contracts during heat conversion, the molded article tends to become loose fitting in the ferrule. The new complex epoxide resins and compositions of the present invention give a tight fitting mold within the brush ferrule. Similarly molded insets can be made which are tight fitting when the composition has been molded in place.

Molding mixtures and reaction mixtures can be made from products of an intermediate degree of polymerization, and in some cases without completion of the reaction between phenolic hydroxyls and the epoxide groups in the intermediate product. Such a partially reacted product, on further heating and conversion, e. g. in molding compositions or film layers, can further react between phenolic and alcoholic hydroxyls and epoxy groups in making the final molded or hardened product or composition. The remarkable chemical inertness of the final products appears to be due to the fact that they are free or substantially free from reactive groups other than hydroxyl groups.

Similarly reaction mixtures may be prepared with an excess of polyhydric phenol and with some free terminal phenolic hydroxyl groups, and a solid resinous product so prepared can be mixed with sufficient polyepoxide to react with the phenolic hydroxyls or an excess of such amount and the resulting mixture used as a molding mixture, or it may be formed into a varnish solution and the reaction between the phenolic hydroxyls and diepoxides carried out during the final hardening operation. Similarly, intermediate reaction products of polyhydric phenols and diepoxide can be prepared, e. g., one containing an excess of dihydric phenol and the other an excess of diepoxide, and these two products mixed in proportion such that there is sufficient epoxide content to react with all of the phenolic groups when the mixture is used as a molding composition or in forming a varnish and the composition is heated to effect the final hardening operation, particularly when a small amount of catalyst is present in the composition.

The invention will be further illustrated by the following specific examples, but it will be understood that the invention is not limited thereto.

The first two examples illustrate the preparation of special polyepoxides from epichlorhydrin and trihydric alcohols.

*Example I.*—In a reaction vessel provided with mechanical stirrer and external cooling means was placed 276 parts (3 mols) of glycerol and 828 parts (9 mols) of epichlorhydrin. To this reaction mixture was added 1 part of 45% boron trifluoride ether solution diluted with 9 parts of ether. The reaction mixture was agitated continuously. The temperature rose to 50° C. over a period of 1 hour and 44 minutes at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation this reaction mixture was gradually heated to 93° C. over a period of 1 hour and 51 minutes and held at this temperature for 8 hours and 49 minutes. After cooling to room temperature the inorganic material was removed by filtration. The dioxane and low boiling products were removed by heating the filtrate to 205° C. at 20 mm. pressure to give 261 parts of a pale yellow product.

This product can be distilled at temperatures above 200° C. at 2 mm. pressure provided it is sufficiently freed from impurities but unless care is taken it is liable to undergo a violent exothermic reaction. It is not, however, necessary to purify this product by distillation since such byproducts as are present do not interfere with the use of the product as a polyepoxide.

The epoxide equivalent of this product was determined by titrating a one gram sample with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering 1 HCl is equivalent to one epoxide group.

The epoxide equivalent represents the equivalent weight of the product per epoxide group. The epoxide equivalent so determined was 149. The molecular weight as determined by a standard boiling point elevation method was 324. This represents an average of 2.175 epoxide groups per molecule, assuming the determined molecular weight is the molecular weight. It is probable that the molecular weight is an average molecular weight of a product containing more than one reaction product. The average molecular weight is higher than that which would correspond to a product made up solely of the reaction product of 1 mol of glycerol with 3 mols of epichlorhydrin and it seems probable that complex reaction products are also formed, some of which may be of a polymeric or cross-linked nature. The product is, however, a valuable product for use as a polyepoxide in making the new compositions.

*Example II.*—By a procedure similar to that described in Example I, 1 mol of trimethylol propane and 3 mols of epichlorhydrin were condensed with boron trifluoride and finally treated with sodium aluminate to give 299 parts of a pale yellow liquid. The product had an equivalent weight to epoxide of 151 and an average molecular weight of 292.2.

This corresponds to approximately 1.94 epoxide groups per molecule, assuming an average molecular weight.

The product of this example can also be distilled at high temperatures and low pressures to give a water white liquid, but such further purification is not necessary and the product obtained can be directly used in making the new compositions. Or the purified product can be produced and similarly used.

The procedure of Examples I and II can be used in preparing complex polyepoxy products from other polyhydric alcohols containing 3 or more hydroxyl groups, for example, from higher molecular weight alcohols containing 3 hydroxyl groups or from higher polyhydric alcohols such as mannitol, sorbitol, erythritol or polyallyl alcohol. For example, a polyepoxide has been obtained from polyallyl alcohol and epichlorhydrin which contained 2.45 epoxide groups per average molecular weight. In general, with polyepoxides made by the reaction of epichlorhydrin on polyhydric alcohols containing 3 or more hydroxyl groups, the number of epoxide groups per molecule (based on average molecular weight) has been found to be materially less than that corresponding to 1 epoxide group per molecule of epichlorhydrin used; but in general polyepoxides can be so produced containing an equivalent of around 2 or more epoxide groups per molecule which are valuable polyepoxides for use in making the new compositions and reaction products of the present invention.

The following examples, III, IV, V and VI, illustrate the preparation of some of the more complex polyhydric phenols for use in making the new compositions.

*Example III.*—In a reaction vessel provided with a reflux condenser and a mechanical stirrer was placed 101.5 parts (0.445 mol) of bis phenol and 68 parts (0.666 mol) of acetic anhydride. This reaction mixture was refluxed for 1 hour with continuous agitation. To this partially acetylated bis phenol was added 187 parts (0.333 mol considered as dimeric acids) of polymerized soy bean oil acids. These polymerized acids were prepared by heating the methyl esters of soy bean acids at 325° C. in the presence of anthraquinone followed by removal of unpolymerized methyl esters by vacuum distillation and liberation of the polymerized acids from the residual polymerized methyl esters by saponification. With continued agitation this reaction mixture was heated at 250 to 260° C. until the theoretical amount of acetic acid displaced was removed by distillation and the acid value of the resulting product had reached 3.4. The product was a viscous sticky product.

The product of this example may be considered a polyhydric phenol in which the bis phenol residues are united through the residues from the dibasic acid and illustrates the preparation of special polyhydric phenols from simpler polyhydric phenols.

*Example IV.*—In a reaction vessel provided with a reflux condenser and a mechanical stirrer was placed 107 parts (0.5 mol) of 1,4-dibromobutene, 171 parts (0.75 mol) of bis phenol, 40 parts (1 mol) of sodium hydroxide and 200 parts of water. This reaction mixture was refluxed for 6 hours with continuous agitation. The upper water layer was removed by decantation and the product was washed three times by stirring with boiling water. The theoretical yield of a product softening (Durrans Mercury Method) at 70° C. was obtained.

*Example V.*—A polyhydric phenol was prepared by the reaction of 3 mols of bis phenol and 2 mols of $\beta,\beta'$-dichlorodiethyl ether with 8 mols of potassium hydroxide and 1 liter of water. The procedure was the same as that in Example IV except the reaction time was refluxing for 48 hours. The product softened at 61° C.

Examples IV and V illustrate the production of complex polyhydric phenols by the reaction of simpler polyhydric phenols (e. g., bis phenol) with dichlorides.

*Example VI.*—In a reaction vessel provided with a reflux condenser and a mechanical stirrer was placed 184 parts (0.805 mol) of bis phenol, 88 parts (0.602 mol) of adipic acid and 121 parts (1.28 mols) of acetic anhydride. This reaction mixture was heated at 240–255° C. with continuous agitation, until the acetic acid was removed and the product had an acid value below 5. This product had a softening point of 82° C.

This example, like Example III, illustrates the production of special, complex polyhydric phenols in which the residues of the simpler polyhydric phenols are united through dibasic acid residues.

The following examples illustrate the production of the new compositions from polyhydric phenols and polyepoxides.

*Example VII.*—To 3.9 parts of diglycid ether and 4.6 parts of bis phenol was added 0.064 part of 20% sodium hydroxide and the resulting mixture was heated for 1 hour and 14 minutes to give a hard, tough, infusible product. Such reaction mixtures are suitable for conversion in a mold or as thin films to form molded objects and protective coatings respectively.

*Example VIII.*—To 4.3 parts of diglycid ether and 2.2 parts of resorcinol was added 0.065 part of potassium hydroxide and the resulting mixture was heated for 10 minutes at 110° C. to give an infusible, insoluble product.

*Example IX.*—To 4.3 parts of diglycid ether and 4.6 parts of bis phenol was added 0.065 part of potassium hydroxide. This mixture is a completely homogeneous liquid solution at room temperature of suitable viscosity for use in forming films, impregnation of wood or fabrics or for use in molding objects.

Films (.003 inch thickness) formed from this reaction mixture were baked for 30 minutes at 150° C. to give extremely hard, tough, and flexible films. A one-third inch layer of the same reaction material was baked for 10 minutes at 110° C. to give a hard, horn-like resin illustrating its use under molding conditions.

Similar results were obtained when the potassium hydroxide was replaced with 0.466 part of diethylene triamine.

*Example X.*—To 4.3 parts of diglycid ether and 2.2 parts of hydroquinone was added 0.02 part of sodium phenoxide. This reaction mixture was heated at 100° C. for 1 hour to give a sticky viscous product. This product was shown by analysis to have an epoxide equivalent of 350. A 50% solution of this product in equal parts of water and ethyl alcohol, treated with 1% by weight of the epoxide composition of sodium phenoxide, was used to form 0.0015 inch films which converted to hard, tough products when baked at 200° C. for 5 minutes.

*Example XI.*—To 4.6 parts of bis phenol and 4.3 parts of diglycid ether was added 0.032 part of 20% sodium hydroxide and the resulting mixture heated for 45 minutes at 100° C. to give a semi-solid material containing one epoxide group per 371 parts. A 50% solution of this product in methyl ethyl ketone treated with 1% by weight of the epoxide composition of sodium phenoxide was used to form 0.0015 inch films which converted to hard, tough products when baked for 30 minutes at 150° C.

*Example XII.*—To 7.5 parts of p,p'-dihydroxy diphenyl sulfone and 7.5 parts of diglycid ether was added 0.006 part of sodium hydroxide and the resulting mixture was heated for 86 minutes at 100° C. to give a product containing 1 epoxide group per 315 parts.

*Example XIII.*—To 29.8 parts of the product of Example I was added 11.4 parts of bis phenol and this mixture was heated gradually to 173° C. and held at 162–173° C. for 2 hours. The resulting product was a viscous, tacky syrup having an epoxide equivalent of 479. When dissolved in methyl ethyl ketone and treated with an equivalent amount of diethylene triamine (as described in my companion application Serial No. 617,177) a varnish was formed which when spread in a thin film and baked for 30 minutes at 150° C. gave a hard, tough film.

*Example XIV.*—To 50 parts of the product of Example II was added 19 parts of bis phenol and the resulting mixture was heated for 2 hours and 10 minutes at 162 to 186° C. to give a soft tacky resin having an epoxide equivalent of 440 and a molecular weight of 828.

*Example XV.*—To 26.4 parts of the product of Example III was added 3.4 parts of diglycid ether.

A small portion of this product was placed in a test tube which was heated in an oil bath at 130° C. for 10 minutes to give an infusible, leather-like product.

Another portion of this mixture was dissolved in methyl ethyl ketone and this solution was used to form thin films which when baked 30 minutes at 150° C. and 30 minutes at 200° C. gave a tough, tack-free film.

*Example XVI.*—To 79 parts of the product of Example IV was added 65 parts of the product of Example I and 1 part of potassium hydroxide. This mixture was heated for 1 hour at 110° C. to give a hard, infusible product.

*Example XVII.*—To 165 parts of the product of Example V was added 88 parts of the product of Example II. This mixture was heated for 1 hour at 150° C. and the resulting product was dissolved in an equal weight of methyl isobutyl ketone and treated with 5 parts of sodium phenoxide. Films spread from this solution and baked for 30 minutes at 150° C. became very hard and tough.

*Example XVIII.*—To 82 parts of the product of Example V was added 39 parts of diglycid ether and 1 part of potassium hydroxide. The resulting mixture was heated for 1 hour at 150° C. to give a tough, hornlike, infusible product.

*Example XIX.*—To 125 parts of the product of Example VI was added 49 parts of the product of Example I and 1 part of sodium hydroxide. The resulting mixture was heated for 1 hour at 150° C. to give a tough, infusible product.

*Example XX.*—To 27 parts of the product of Example V was added 5.55 parts of diglycid ether and the resulting mixture heated for 2 hours and 50 minutes at 157° C. to 179° C. giving a product which softened at 77° C. A methyl ethyl ketone solution of this product treated with 5% of the weight of the solids of diethylene triamine gave a varnish which when spread in thin films and baked 30 minutes at 150° C. gave extremely hard, flexible films.

The new polyepoxide-polyhydroxy products of the presnet invention are valuable products in the manufacture of varnishes, molding compositions, adhesives, etc., being capable of polymerization to give compositions varying from hard, brittle, fusible solids to hard, non-brittle, infusible solids and giving polymerization products containing a high percentage of hydroxyl groups.

It is a characteristic of the process of the invention and the production of the new polyepoxide products and compositions that no by-products are formed and the reaction takes place directly in a dry state between epoxide groups and phenolic hydroxyl groups. Accordingly, the reaction can be carried out by using the initial ingredients in solution in organic solvents or in molding compositions, and carrying out the reaction after the solution has been applied or to the molding composition in the mold, with heating to effect the reaction and to bring about directly the final reaction product. By using the polyhydric phenol and polyepoxide in approximately equivalent proportions, or with an excess of the polyepoxide, a molding mixture can thus be made, particularly when a small amount of catalyst is added, which will give a final insoluble, infusible molded article.

The new complex polymeric epoxides, containing reactive epoxide groups, can be reacted with compounds containing active hydrogen, such as amines, and particularly polyamines, amides, mercaptans, polyhydric alcohols, polyimines, etc. to give a wide variety of valuable reaction products. Thus, difunctional reactants or polyfunctional reactants may serve to cross-link different molecules through reaction with terminal epoxide groups, and in some cases through intermediate hydroxyl groups. By using a difunctional reactant or polyfunctional reactant that reacts with epoxide groups but not with hydroxyl groups, in proportions equivalent to the epoxide groups, different molecules may be joined together by cross-linking in this way. Where cross-linking reagents are used that react with hydroxyl, or with both hydroxyl and epoxy groups, a different and more complex structure may be obtained. The use of less than the equivalent amount of cross-linking reagents enables modified products to be obtained, and in some cases infusible products.

Thus by compounding the new complex epoxide compositions with an amount of polyhydric phenol, approximately equivalent to the epoxide content of the composition, and with the use of a small amount of catalyst such as the alkali salt of the polyhydric phenol, the resulting mixture on heating will cause reaction between the polyhydric phenol and the epoxide groups with resulting cross-linking and the production of higher molecular and infusible products.

The new complex reaction products of polyhydric phenols and polyepoxides and containing terminal epoxide groups can advantageously be reacted with amines as described in my companion application Serial No. 617,177, now U. S. Patent 2,585,115, to form valuable amine-epoxy reaction products which may be infusible products having valuable properties for making films, molded compositions, etc.

Other polyfunctional cross-linking reactants which react with epoxide groups or with hydroxyl groups or with both epoxide and hydroxyl groups can similarly be used for bringing about cross-linking which may be accompanied by further reaction of epoxide and hydroxyl groups to form high molecular weight products or infusible products including diisocyanates, e. g. methylene bis (4-phenyl) isocyanate, dialdehydes, e. g., glyoxal, dimercaptans, amides, polyamides, etc.

Thus the present invention provides new compositions and new reaction products which are valuable as raw materials in the manufacture of varnishes, molding resins, adhesives, fibers, filaments, etc. In general they are capable of polymerization particularly in the presence of catalysts and by the use of cross-linking reactants, and even in some cases without catalysts or cross-linking reactants to form insoluble, infusible final products.

Where the further reaction or polymerization of the complex epoxide compositions takes place through reaction of epoxide and hydroxyl groups, the final reaction or polymerization products may be free or relatively free from epoxy groups and contain only or mainly hydroxyl groups in addition to hydrocarbon residues and ether linkages.

The compositions and the reaction products vary from liquid products to soft or brittle solids. The reacted or polymerized products give compositions varying from hard, brittle, fusible solids to hard, non-brittle, infusible solids. The new complex compositions and reaction products react and polymerize to give final products containing a high percentage of hydroxyl groups.

The final infusible reaction and polymerization products made with the new compositions and the new reaction products have a remarkable combination of desirable properties including resistance to water, solvents, alkalies, and acids, toughness combined with hardness, flexibility at low temperatures, ability to withstand high temperatures with little or no discoloration, resistance to chemicals, wettability to most pigments, low viscosity at high solids content of solutions, and hardening of thick films through chemical reactions within the film itself when a suitable catalyst or cross-linking reactant is used so that paint and varnish coatings far beyond the usual thickness can be applied.

This application is in part a continuation of my prior applications Serial Nos. 502,317 filed September 14, 1943, now Patent 2,456,408 and 535,342 filed May 12, 1944, now Patent No. 2,503,726.

I claim:

1. A complex polymeric resinous polyepoxide composition resulting from the direct addition-reaction of dihydric phenols free from reactive groups other than phenolic hydroxyl groups and aliphatic diepoxides free from reactive groups other than epoxide and aliphatic hydroxyl groups and having the following general formula:

$$R_1-[O-R-O-R_2]_n-O-R-O-R_1$$

in which R is the residue of the dihydric phenol, $R_2$ is an aliphatic radical containing two aliphatic hydroxyl groups, $R_1$ is an aliphatic radical containing an alcoholic hydroxyl group and a terminal epoxide group, and $n$ is at least 1.

2. The method of making epoxide resins capable of conversion by heating with an alkaline catalyst into insoluble, infusible products which comprises heating and reacting a mixture consisting essentially of a dihydric phenol free from reactive groups other than phenolic hydroxyl groups and an aliphatic diepoxide free from reactive groups other than epoxide groups in proportions such that the number of epoxide groups of the diepoxide is greater than the number of phenolic hydroxyl groups of the dihydric phenol and not more than twice the number of such phenolic hydroxyl groups, said reaction taking place by direct addition-reaction of epoxide groups and phenolic hydroxyl groups to produce resinous reaction products containing terminal epoxide groups, whereby polyether reaction products are produced containing terminal epoxide groups and also containing aliphatic hydroxyl groups and which are capable of further reaction in the presence of an alkaline catalyst through epoxide and aliphatic hydroxyl groups to produce infusible, insoluble products.

3. The method of making epoxide resins capable of conversion by heating with an alkaline catalyst into insoluble, infusible products which comprises heating and reacting a mixture consisting essentially of a dihydric phenol free from reactive groups other than phenolic hydroxyl groups and an aliphatic diepoxide free from reactive groups other than epoxide groups in proportions varying from between 2 mols of diepoxide to 1 of dihydric phenol to 6 mols of diepoxide to 5 mols of dihydric phenol, said reaction taking place by direct addition-reaction of epoxide groups and phenolic hydroxyl groups to produce resinous reaction products containing terminal epoxide groups, whereby polyether reaction products are produced containing terminal epoxide groups and also containing aliphatic hydroxyl groups and which are capable of further reaction in the presence of an alkaline catalyst through epoxide and aliphatic hydroxyl groups to produce infusible, insoluble products.

4. The process according to claim 2 in which the dihydric phenol is p,p'dihydroxydiphenyldimethyl methane.

5. The process according to claim 3 in which the dihydric phenol is p,p'dihydroxydiphenyldimethyl methane.

6. A composition capable of reaction to form epoxide resins which convert by heating with an alkaline catalyst into insoluble, infusible products, said composition consisting essentially of a dihydric phenol free from reactive groups other than phenolic hydroxyl groups and an aliphatic diepoxide free from reactive groups other than epoxide groups, the molecular proportion of diepoxide to dihydric phenol being substantially greater than 1 to 1 and not greater than 2 to 1, said composition being capable of reaction through epoxide groups and phenolic hydroxyl groups to produce polyether resins having terminal epoxide groups and also having aliphatic hydroxyl groups, and which resins are capable of further reaction in the presence of an alkaline catalyst through epoxide and aliphatic hydroxyl groups to produce infusible, insoluble products.

7. A composition as defined in the preceding claim in which the dihydric phenol is p,p'dihydroxydiphenyldimethyl methane.

8. A varnish composition containing in solution in a volatile organic solvent the composition of claim 6.

9. Insoluble, infusible reaction products resulting from the direct addition-reaction of the composition of claim 6.

10. Polyepoxide resins containing terminal epoxide groups and also containing aliphatic hydroxyl groups, said resins being direct addition-reaction products of a reaction mixture consisting essentially of a dihydric phenol free from reactive groups other than phenolic hydroxyl groups and an aliphatic diepoxide free from reactive groups other than epoxide groups, the proportions of diepoxide reacting with dihydric phenol being substantially in excess of 1 mol to 1 mol and being not greater than 2 mols of diepoxide to 1 mol of dihydric phenol, said resins being capable of further reaction between terminal epoxide groups and intermediate alcoholic hydroxyl groups to form insoluble, infusible products.

11. Polyepoxide resins as defined in claim 10 in which the dihydric phenol reacted is p,p'dihydroxydiphenyldimethyl methane.

12. A composition as defined in claim 6 in which the dihydric phenol is p,p'-dihydroxydiphenyldimethyl methane and the aliphatic diepoxide is diglycide ether.

13. Polyepoxide resins as defined in claim 10 in which the dihydric phenol reacted is p,p'-dihydroxydiphenyldimethyl methane and the aliphatic diepoxide is diglycide ether.

SYLVAN OWEN GREENLEE.

REFERENCES CITED

The following references are of record in the file of this patent:

UNITED STATES PATENTS

| Number | Name | Date |
| --- | --- | --- |
| 2,213,477 | Steindorff et al. | Sept. 3, 1940 |
| 2,324,483 | Castan | July 20, 1943 |
| 2,411,029 | De Groote et al. | Nov. 12, 1946 |
| 2,503,726 | Greenlee | Apr. 11, 1950 |